(12) United States Patent  
Tanaka (10) Patent No.: US 9,193,218 B2  
(45) Date of Patent: Nov. 24, 2015

(54) PNEUMATIC TIRE

(71) Applicant: SUMITOMO RUBBER INDUSTRIES, LTD., Kobe-shi, Hyogo (JP)

(72) Inventor: Satoshi Tanaka, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 601 days.

(21) Appl. No.: 13/644,016

(22) Filed: Oct. 3, 2012

(65) Prior Publication Data

US 2013/0105053 A1    May 2, 2013

(30) Foreign Application Priority Data

Oct. 28, 2011    (JP) .................................. 2011-237673

(51) Int. Cl.
*B60C 11/12* (2006.01)
*B60C 11/03* (2006.01)
*B60C 11/11* (2006.01)

(52) U.S. Cl.
CPC ......... *B60C 11/1281* (2013.04); *B60C 11/0306* (2013.04); *B60C 11/11* (2013.01); *B60C 2011/129* (2013.04); *B60C 2011/1209* (2013.04)

(58) Field of Classification Search
CPC .................................................. B60C 11/1281
See application file for complete search history.

(56) References Cited

U.S. PATENT DOCUMENTS 5,385,189 A * 1/1995 Aoki et al. ............... 152/209.21

FOREIGN PATENT DOCUMENTS

| EP | 1920951 | * | 5/2008 |
| JP | 3-7604 A | | 1/1991 |
| JP | 07-172111 | * | 7/1995 |
| JP | 2009-166762 | * | 7/2009 |

* cited by examiner

*Primary Examiner* — Steven D Maki
*Assistant Examiner* — Robert Dye
(74) *Attorney, Agent, or Firm* — Birch Stewart Kolasch & Birch, LLP (57) ABSTRACT

A pneumatic tire comprises a tread portion provided with a tread element provided with a pair of sipes. Each sipe comprises a radially outer constant width part and a widening part extending radially inwardly from the constant width part while gradually increasing the width of the sipe and then extending to the radially inner end of the sipe while gradually decreasing the width of the sipe. Each of the paired sipes has an inside sidewall surface positioned toward the other of the paired sipes and an outside sidewall surface positioned away from the other of the paired sipes. The inside sidewall surface includes an inside curved bottom surface having a radius of curvature Rib. The outside sidewall surface includes an outside curved bottom surface having a radius of curvature Rob more than the radius of curvature Rib.

8 Claims, 5 Drawing Sheets

AMENDED

PNEUMATIC TIRE

BACKGROUND OF THE INVENTION

The present invention relates to a pneumatic tire whose tread portion is provided with sipes, more particularly to a design of a pair of sipes capable of preventing cracks at the bottoms of the sipes and improving demolding of the vulcanization mold with siping blades.

Pneumatic tires are often provided in the tread portion with sipes in order to adjust the rigidity of ground contacting tread elements such as block, rib and the like, or increase edge effect for improving the traction performance and braking performance on icy roads for example. If such sipped tire receives a force to open the sipes during rolling and as a result stress concentrates at the bottoms of the sipes, there is a possibility that cracks occur at the bottoms of the sipes.

Figure 5A:
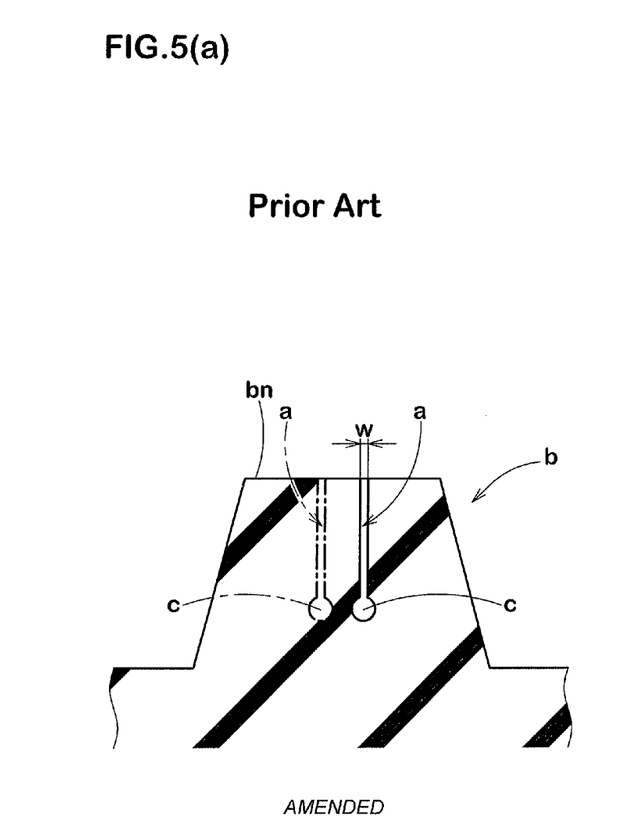
FIG. 5(a) is a cross sectional view of a block with conventional sipes.

In Japanese Patent Application Publication No. H3(1991)-007604, in order to prevent cracks, a sipe (a) is provided at the bottom with a circular cross sectional shape (c) whose diameter is larger the thickness (w) of the sipe as shown in FIG. 5(a).

Figure 5B:
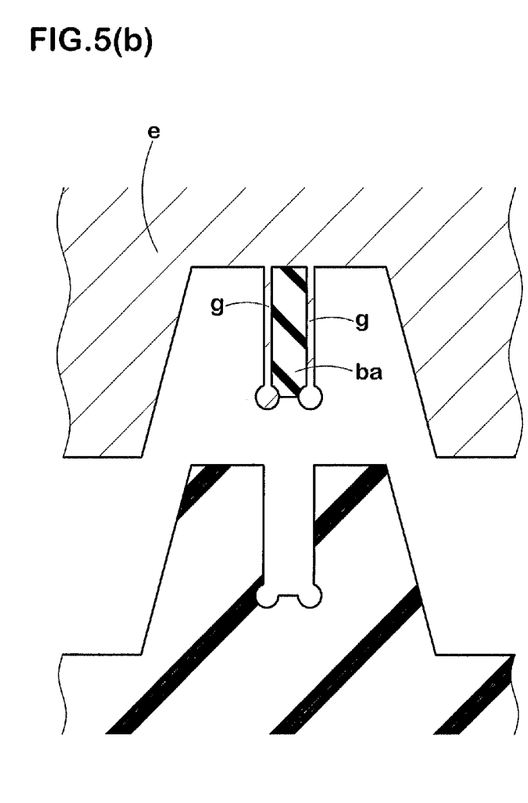
FIG. 5(b) is a cross sectional view of the block for explaining the problem with the conventional sipes when demolding.

If such sipes (a) are formed at small intervals by the use of siping blades (g) provided on the inside of a vulcanizing mold, then it becomes hard to demold or the rubber (ba) between the siping blades (g) is torn off by the siping blades (g) when demolding as shown in FIG. 5(b).

SUMMARY OF THE INVENTION

It is therefore, an object of the present invention to provide a pneumatic tire in which cracks at the bottoms of sipes can be prevented, and the demolding of the vulcanization mold with siping blades can be made without difficulty and without tearing-off of the rubber between the siping blades.

According to the present invention, a pneumatic tire comprises a tread portion provided with a plurality of ground contacting tread elements such as block, rib and the like made of rubber, each of the ground contacting tread elements provided with at least one pair of sipes extending substantially parallel with each other, each of the sipes comprising a constant width part having a constant width and extending radially inwardly from the tread surface and a widening part extending radially inwardly from the constant width part while gradually increasing the width of the sipe and then extending to the radially inner end of the sipe while gradually decreasing the width of the sipe, each of the paired sipes having an inside sidewall surface (11u) positioned toward the other of the paired sipes and an outside sidewall surface (11s) positioned away from the other of the paired sipes, in the cross section of the sipe perpendicular to the longitudinal direction of the sipe, the outside sidewall surface in the widening part having an outside most protruding point (15) protruding toward the outside of the sipe and including an outside curved bottom surface (17) extending radially inwardly from the outside most protruding point toward the center line (6n) of the sipe while describing an arc, and the inside sidewall surface in the widening part having an inside most protruding point (16) protruding toward the outside of the sipe and including an inside curved bottom surface (18) extending radially inwardly from the inside most protruding point (16) toward the center line (6n) of the sipe while describing an arc, wherein the inside curved bottom surface has a radius of curvature Rib and the outside curved bottom surface has a radius of curvature Rob more than the radius of curvature Rib.

The pneumatic tire according to the present invention may be further provided with the following optional features:

the outside most protruding point is shifted from the inside most protruding point in the tire radially radial direction;

the outside most protruding point is positioned radially outside the inside most protruding point;

the shortest distance Wso from the outside most protruding point (15) to a center line (6n) of the sipe, the shortest distance Wsi from the inside most protruding point (16) to the center line (6n) of the sipe, and the shortest distance Wsh from the sidewall surface (11) of the constant width part (13) to the center line (6n) of the sipe satisfy the following relationships, Wso−Wsh=<0.6 mm and Wsi−Wsh=<0.6 mm;

the outside sidewall surface (11s) of the widening part (14) includes an outside concave surface (19) extending radially inwardly toward the outside most protruding point (15) while gradually increasing the distance from the center line (6n) of the sipe;

the inside sidewall surface (11u) of the widening part (14) includes an inside concave surface (20) extending radially inwardly toward the inside most protruding point (16) while gradually increasing the distance from the center line (6n) of the sipe;

the outside concave surface has a radius of curvature Roa more than the radius of curvature Rob of the outside curved bottom surface, and the inside concave surface has a radius of curvature Ria more than the radius of curvature Rib of the inside curved bottom surface;

the above-mentioned plurality of ground contacting tread elements are at least one row of circumferentially arranged blocks, each block provided with one pair of the sipes each extending at an angle of not more than 20 degrees with respect to the tire axial direction, and a minimum circumferential distance (TS) between the sipes is more than 0.2 times and less than 1.0 times a minimum circumferential distance from each of the sipes to a circumferential end of the block on the same side as the sipe concerned.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring RiM" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch (camber angle=0) in the normally inflated loaded condition.

The tread width TW is the axial distance between the tread edges Te measured in the normally inflated unloaded condition of the tire.

DESCRIPTION OF THE PREFERRED EMBODIMENTS

Embodiments of the present invention will now be described in detail in conjunction with the accompanying drawings.

The present invention can be applied to all kinds of pneumatic tires provided with sipes and manufactured by the use of a vulcanization mold having sipping blades, for example, studless tires, all season tires, summer tires, etc. for passenger cars, trucks and buses, motorcycles and all the rest.

The pneumatic tire 1 according to the present invention comprises a tread portion 2, a pair of axially spaced bead portions each with a bead core therein, a pair of sidewall portions extending between the tread edges and the bead portions, a carcass extending between the bead portions, and a tread reinforcing belt disposed radially outside the carcass in the tread portion as well known in the art.

The tread portion 2 is provided with a plurality of ground contacting tread elements 5 such as block, rib and the like 5, each provided with at least one pair of substantially parallel sipes 6.

The sipes 6 each have a radially outer constant width part 13 and a radially inner widening part 14.

Figure 4:
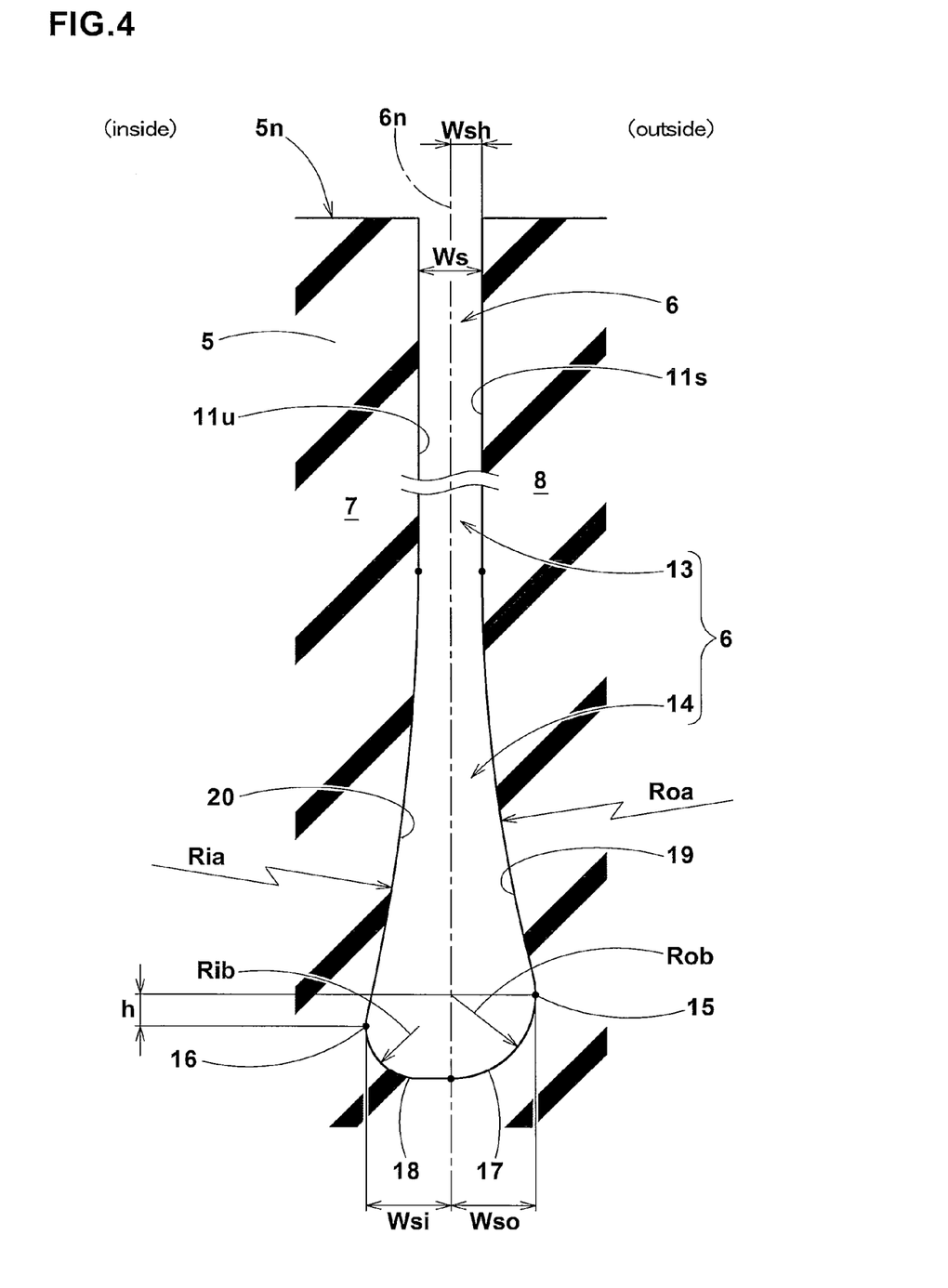
FIG. 4 is an enlarged cross sectional view of one of the sipes shown in FIG. 3.

As shown in FIG. 4, in the cross section of the sipe 6 perpendicular to the longitudinal direction of the sipe, the constant width part 13 extends radially inwardly from the top of the tread element 5 and has a constant width WS.

In this embodiment, the constant width part 13 extends straight in parallel with the tire radial direction.

The center line 6n of the sipe 6 is defined by a straight line dividing the width of the constant width part 13 into two. The width WS of the constant width part 13 is preferably set in a range of from 0.4 to 1.0 mm.

The widening part 14 extends radially inwardly from the radially inner end of the constant width part 13 while gradually increasing the width WS of the sipe, and then extends to its radially inner end while gradually decreasing the width WS. In this embodiment, as shown in FIG. 4, the widening part 14 has a cross sectional shape like a waterdrop.

Thus, owing to the widening part 14, the stress concentration at the sipe bottom is mitigated, and the occurrence of cracks can be prevented.

In the paired sipes 6, each sipe has an inside sidewall surface 11u positioned toward the other sipe and an outside sidewall surface 11s positioned away from the other sipe.

In the widening part 14, the outside sidewall surface 11s has an outside most protruding point 15 protruding toward the outside of the sipe, and the inside sidewall surface 11u has an inside most protruding point 16 protruding toward the outside of the sipe.

In the widening part 14, the outside sidewall surface 11s includes an outside curved bottom surface 17 extending radially inwardly from the outside most protruding point 15 toward the sipe center line 6n while describing an arc, and the inside sidewall surface 11u includes an inside curved bottom surface 18 extending radially inwardly from the inside most protruding point 16 toward the sipe center line 6n while describing an arc.

The inside curved bottom surface 18 has a radius of curvature Rib, and the outside curved bottom surface 17 has a radius of curvature Rob which is more than the radius of curvature Rib. Preferably, the ratio Rob/Rib is set in a range of not less than 1.2, more preferably not less than 1.5, but not more than 2.0, more preferably not more than 1.8.

The radius of curvature Rob is preferably set in a range of not less than 0.6 mm, more preferably not less than 0.7 mm, but not more than 1.0 mm, more preferably not more than 0.9 mm.

The radius of curvature Rib is preferably set in a range of not less than 0.5 mm, more preferably not less than 0.6 mm, but not more than 0.8 mm, more preferably not more than 0.7 mm.

In general, a stress concentration is more liable to occur in the outside curved bottom surface 17 than the inside curved bottom surface 18. Therefore, in order to mitigate the stress on the outside curved bottom surface 17, the radius of curvature Rob of the outside curved bottom surface 17 is made larger than the radius of curvature Rib of the inside curved bottom surface 18. Thus, the occurrence of cracks can be prevented.

If the ratio Rob/Rib becomes excessively increased, cracks become liable to occur in the inside curved bottom surface 18. Further, there is a possibility that the pull-out resistance of the siping blades is increased and it becomes difficult to demold the vulcanization mold. If the ratio Rob/Rib becomes excessively decreased, the stress concentration in the outside curved bottom surface 17 is not fully mitigated, and it becomes difficult to prevent the occurrence of cracks.

Figure 3:
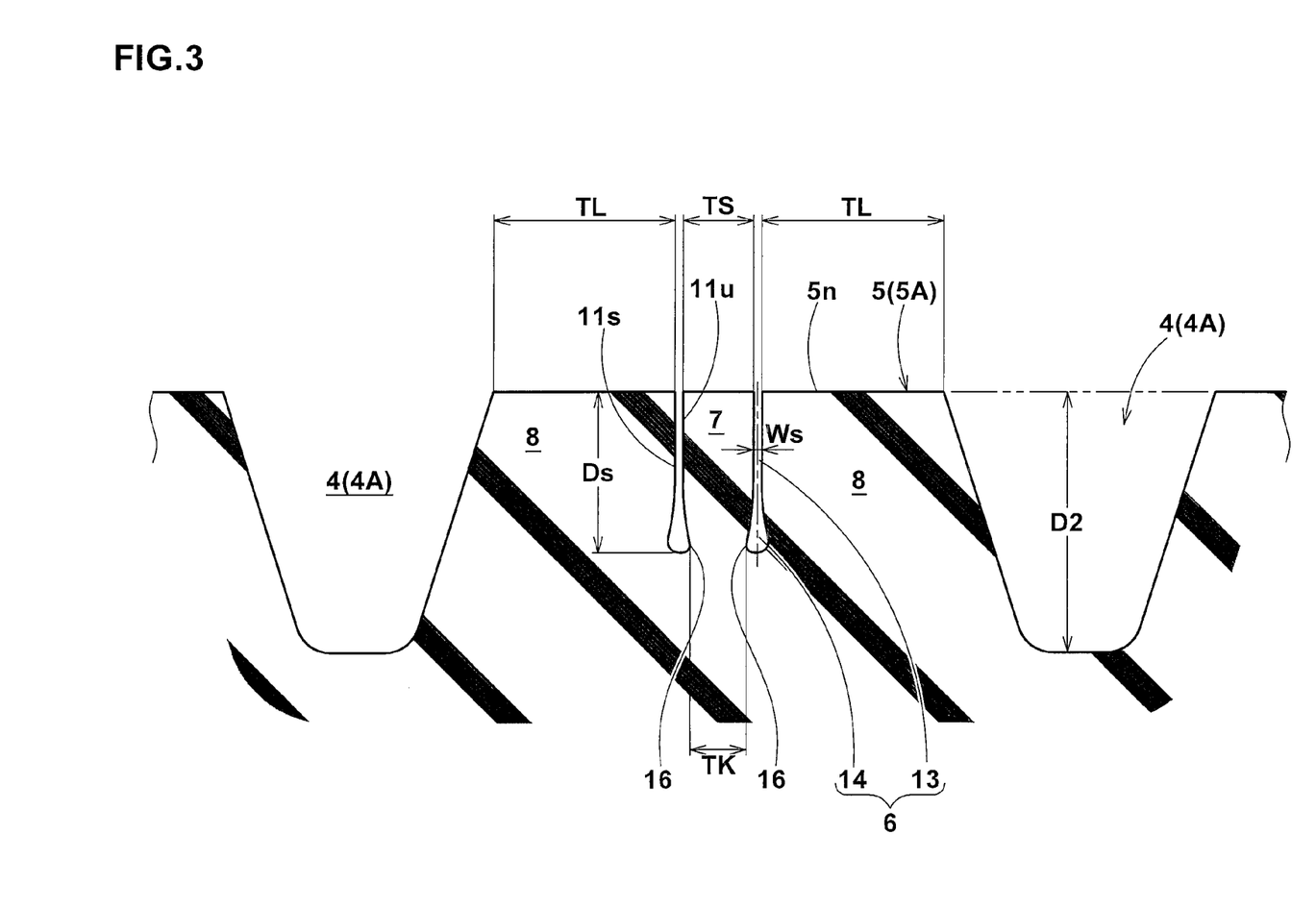
FIG. 3 is a cross sectional view of the block taken along line A-A of FIG. 1.

As shown in FIG. 3, with respect to the paired sipes 6, the distance TK between their inside most protruding points 16 is preferably set in a range of not less than 0.5 times, more preferably not less than 0.7 times, but not more than 1.0 times, more preferably not more than 0.8 times the distance TS between their constant width parts 13.

If the distance TK becomes less than 0.5 times the distance TS, a part 7 of the tread rubber between sipes 6 (hereinafter the "in-between part" 7) is subjected to a large shearing force when demolding, and there is a possibility that the in-between part 7 is torn off when demolding or the demolding becomes difficult. If the distance TK becomes more than 1.0 times the distance TS, there is a possibility that outside parts 8 of the tread element 5 on both sides of the paired sipes 6 are decreased in the rigidity and as a result cracks can not be fully prevented.

If the outside most protruding point 15 is formed at the same radial position as the inside most protruding point 16, when pulling out the siping blade, the corresponding protruding points of the siping blades are resisted by the narrower constant width part 13. In view of this, the outside most protruding point 15 is preferably shifted from the inside most protruding point 16 in the tire radial direction in order to reduce the pull-out resistance and improve the demolding. In this case, it is preferable that the outside most protruding point 15 is formed radially outside the inside most protruding point 16.

If the radial distance (h) between these points 15 and 16 becomes excessively increased, there is a possibility that the volume of the sipe is increased and the rigidity of the abovementioned outside part 8 is decreased, therefore, the sipe becomes liable to open during rolling of the tire, and cracks are liable to occur. It is therefore, preferable that the radial distance (h) between these points 15 and 16 is set in a range of not less than 0.15 mm, preferably not less than 0.2 mm, but not more than 0.5 mm, preferably not more than 0.4 mm.

Further, it is preferable that the shortest distance Wso from the outside most protruding point 15 to the sipe center line 6n, the shortest distance Wsi from the inside most protruding point 16 to the sipe center line 6n, and the shortest distance Wsh from the sidewall surface 11 of the constant width part 13 to the sipe center line 6n satisfy the following relationships:

$$Wso-Wsh=<0.6 \text{ mm, and}$$

$$Wsi-Wsh=<0.6 \text{ mm.}$$

The difference Wso−Wsh is preferably not less than 0.4 mm. The difference Wsi−Wsh is preferably not less than 0.3 mm and not more than 0.5 mm.

If the difference Wso−Wsh is more than 0.6 mm, or the difference Wsi−Wsh is more than 0.6 mm, then the pull-out resistance is increased. If the difference Wso−Wsh is less than 0.4 mm, it becomes difficult to mitigate the stress in the sipe bottom. In comparison with the outside sidewall surface 11s, the stress concentration at the sipe bottom is less in the inside sidewall surface 11u, therefore, it is possible to make the difference Wsi−Wsh be less than the difference Wso−Wsh.

In this embodiment, the outside sidewall surface 11s of the widening part 14 includes an outside concave surface 19 extending from the radially inner edge of the outside sidewall surface 11s of the constant width part 13 toward the outside curved bottom surface 17 while gradually increasing the distance from the sipe center line 6n toward the radially inside. Also, the inside sidewall surface 11u of the widening part 14 includes an inside concave surface 20 extending from the radially inner edge of the inside sidewall surface 11u of the constant width part 13 toward the inside curved bottom surface 18 while gradually increasing the distance from the sipe center line 6n toward the radially inside.

The outside concave surface 19 is smoothly connected to the outside curved bottom surface 17 and the outside sidewall surface 11s of the constant width part 13.

The inside concave surface 20 is smoothly connected to the inside curved bottom surface 18 and the inside sidewall surface 11u of the constant width part 13.

For that purpose, in this embodiment, in the above-mentioned cross section of the sipe, the outside concave surface 19 is formed by a circular arc having a radius of curvature Roa which is more than the radius of curvature Rob of the outside curved bottom surface 17, and the inside concave surface 20 is formed by a circular arc having a radius of curvature Ria which is more than the radius of curvature Rib of the inside curved bottom surface 18. Therefore, the pull-out resistance is further decreased to improve the demolding, and higher rigidity is maintained in the neighborhood of the outside most protruding point 15 and inside most protruding point 16 to prevent the occurrence of cracks.

In order to effectively derive this advantages effect, the radius of curvature Roa of the outside concave surface 19 is preferably set in a range of not less than 10 times, more preferably not less than 15 times, but not more than 40 times, more preferably not more than 25 times the radius of curvature Rob of the outside curved bottom surface 17.

And the radius of curvature Ria of the inside concave surface 20 is preferably set in a range of not less than 25 times, more preferably not less than 30 times, but not more than 60 times, more preferably not more than 50 times the radius of curvature Rib of the inside curved bottom surface 18

The radius of curvature Ria of the inside concave surface 20 is preferably not less than 5.0 mm and not more than 25 mm. The radius of curvature Roa of the outside concave surface 19 is preferably not less than 5.0 mm and not more than 20 mm.

Further, it is preferable that the depth DS of the sipes 6 is set in a range of from 40 to 60% of the depth D2 of the adjacent grooves 4.

Figure 1:
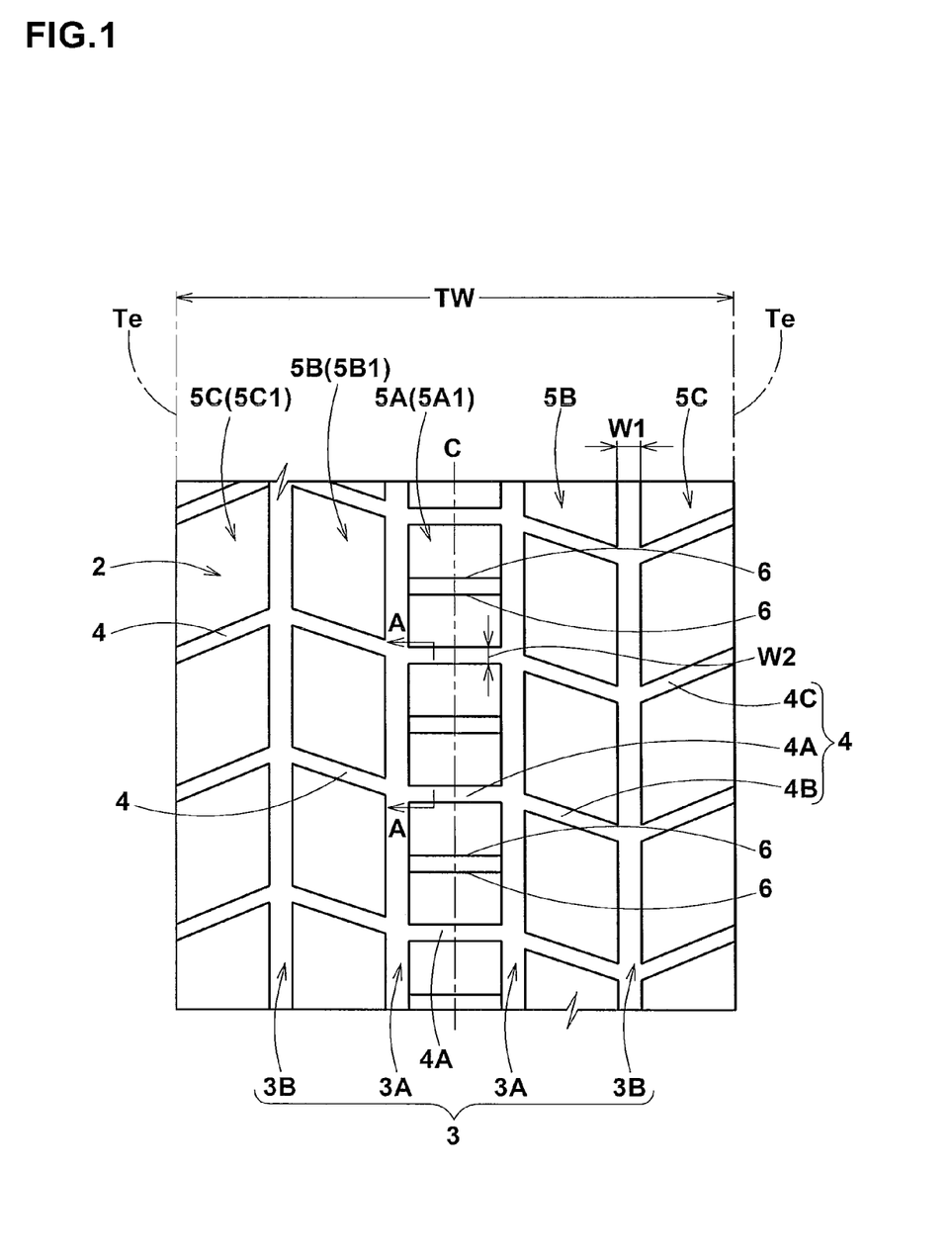
FIG. 1 is a developed partial plan view of a pneumatic tire as embodiment of the present invention showing a tread portion.

In FIG. 1 showing an example of the tread pattern, the ground contacting tread elements 5 provided with the above-mentioned sipes 6 are formed as a plurality blocks arranged in a row along the tire equator C. Needless to say, the arrangement of the blocks 5 is not limited to this example. Various arrangements are possible.

The tread pattern shown in FIG. 1 comprises a plurality of circumferentially continuously extending main grooves 3 and a plurality of axial grooves 4 intersecting the main grooves 3. The main grooves 3 are a pair of crown main grooves 3A disposed on each side of the tire equator C, and a pair of shoulder main grooves 3B disposed axially outside the crown main grooves 3A, respectively. The axial grooves 4 are a plurality of center axial grooves 4A extending between the crown main grooves 3A, a plurality of middle axial grooves 4B extending between the crown main grooves 3A and shoulder main grooves 3B, and a plurality of shoulder axial grooves 4c extending between the shoulder main grooves 3B and the tread edges Te. Thus, the tread portion 2 is divided into blocks including: one row 5A1 of center blocks 5A (or the blocks 5 with the sipes 6) defined by the two crown main grooves 3A and the center axial grooves 4A; two row 5B1 of middle blocks 5B defined by the crown main grooves 3A, shoulder main grooves 3B and middle axial grooves 4B; and two rows 5c1 of shoulder blocks 5c defined by the shoulder main grooves 3B and shoulder axial grooves 4C.

The tread pattern is, of course, not limited to this block pattern. Various patterns are possible, for example, a rib-based pattern comprising a row of the blocks 5 arranged along the tire equator C and circumferentially-continuously extending ribs disposed on both sides of the block row, a rib-block pattern comprising a circumferentially-continuously extending rib disposed along the tire equator C and rows of the blocks 5 disposed on both sides of the rib, a block pattern consist of the blocks 5 with sipes 6 and the like.

In the example shown in FIG. 1, all of the main grooves 3 are straight grooves parallel with the tire circumferential direction. Further, all of the axial grooves 4 are straight groove parallel with the tire axial direction. However, each of the main grooves 3 may have a zigzag configuration (inclusive of wavy configuration). Further, the main grooves 3 may have different configurations. Each of the axial grooves 4 may have a curved configuration, or a zigzag configuration (inclusive of wavy configuration). Further, the axial grooves 4 may have different configurations According to the present invention, the widths W1 and depths D1 of the main grooves 3 and the widths W2 and depths D2 of the axial grooves 4 are not critical. However, in view of the drainage and block rigidity, it is preferable that the widths W1 of the main grooves 3 are 2 to 8% of the tread width TW, the widths W2 of the axial grooves 4 are 1 to 5% of the tread width TW, the depths D1 of the main grooves 3 are 4 to 12 mm, and the depths D2 of the axial grooves 4 are 3 to 9 mm.

In the circumferential row of the blocks 5, the paired sipes 6 in each block 5 extend at an angle θ of not more than 20 degrees, preferably not more than 15 degrees, more preferably not more than 10 degrees, most preferably 0 degree with respect to the tire axial direction. Therefore, if the tire 1 is designed as a studless tire, owing to the edge effect and wiping effect of the sipes 6, the traction performance and braking performance of the tire on icy roads can be improved. If the angle θ is more than 20 degrees, since the axial component of the edges decreases, it becomes difficult to improve the traction performance and braking performance of the tire on icy roads.

The paired sipes 6 in this example extend straight in parallel with each other to maintain the rigidity of the block 5 and to bring out the edge effect.

However, it may be possible that the sipes 6 are zigzag and that the sipes 6 are not completely parallel with each other as far as the angle θ is within the above-mentioned range.

The axial length La of the sipe 6 is preferably set in a range of from 60 to 100% of the axial width wa of the block 5. In the example shown in FIG. 1, the sipes 6 extend across the entire width of the block 5 (La=Wa) so that both ends of each of the sipes 6 are opened to the adjacent grooves 3. Therefore, in the case of a studless tire, owing to the edge effect and wiping effect of the siped 6, the traction performance and braking performance of the tire on icy roads can be improved. Aside from such open type sipe having two open ends, it is also possible that the sipes 6 are formed as a closed type having two closed ends or a semi-open type having an closed end and an open end.

Further, it is preferable that the depth DS of the sipes 6 is set in a range of from 40 to 60% of the depth D2 of the axial grooves 4 adjacent to the block 5 in order not to reduce the rigidity of the block 5 and in order to derive the edge effect from the sipes for a relatively long time.

Figure 2:
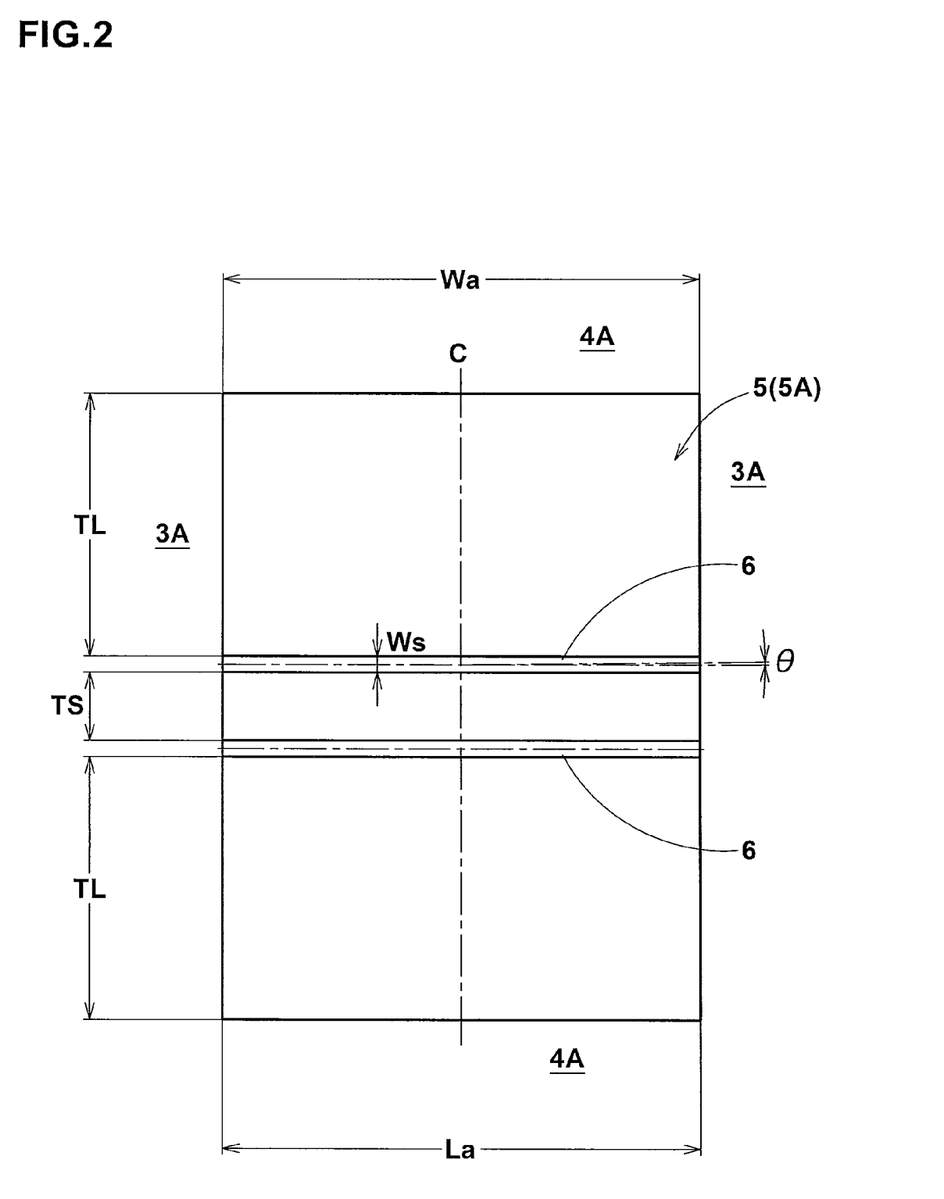
FIG. 2 is an enlarged top view of a block shown in FIG. 1.

As shown in FIG. 2, by the paired sipes 6, there are defined on the block the above-mentioned in-between part 7 of the block 5 between the paired sipes 6 and a part of the above-mentioned outside parts 8 on both sides of the in-between part 7.

In the case of example shown in FIG. 2, the minimum circumferential length (TS) of the in-between part 7 (corresponding to the minimum circumferential distance TS between the sipes) is set in a range of more than 0.2 times, preferably not less than 0.3 times, more preferably not less than 0.4 times, but less than 1.0 times, preferably not more than 0.8 times, more preferably not more than 0.7 times the tire circumferential length TL of the outside part 8 (corresponding to the minimum circumferential distance from each of the sipes to a circumferential end of the block on the same side as the ripe).

If the length (TS) is 0.2 or less times the length TL, the rigidity of the in-between part 7 becomes insufficient, and there is a possibility that the in-between part 7 suffers from uneven wear or tearing-off.

If the length (TS) is 1.0 or more times the length TL, the rigidity of the outside part 8 becomes decreased, and the sipe 6 opens largely during running, therefore, cracks are liable to occur at the sipe bottom.

Comparison Tests

Test tires of size 11R22.5 (rim size 7.5×22.5) for truck/bus having the tread pattern shown in FIG. 1 were manufactured, changing specifications relating to the sipes as shown in Table 1. Common specifications are as follows.

Sipes:
  width WS in the constant width part: 0.6 mm
  depth DS: 11 mm
  length La: 100% of block width Wa
Main Grooves:
  width W1: 6.0 to 8.0% of tread width TW
  depth D1: 20 to 21 mm
Axial Grooves
  width W2: 4.0 to 5.0% of tread width TW
  depth D2: 15 mm to 21 mm <Demolding Test>

Each kind of test tires were vulcanized by the use of a mold provided with siping blades. After demolding, the mold was checked whether the tread rubber stayed between the siping blades. If rubber was found to have stayed, the number of blocks damaged thereby was counted and indicated in Table 1 in percentage of the total number of all the blocks with the Sipes. Thus, the lower the percentage, the better the demolding.

<Crack Resistance Test>

Further, using the tires without the damaged blocks, a crack resistance test was carried out. The test tires were installed on a truck and run for 10000 km on an asphalt road in a tire test course. Then, the number of the blocks, at the sipe bottoms of which cracks occurred, was counted and indicated in Table 1 in percentage of the total number of all the blocks with the sipes. Thus, the lower the percentage, the better the crack resistance.

From the test results, it was confirmed that, according to the invention, it is possible to improve the demolding and crack resistance.

TABLE 1

| Tire | Ref. 1 | Ex. 1 | Ex. 2 | Ex. 3 | Ex. 4 | Ref. 2 | Ref. 3 | Ex. 5 | Ex. 6 |
|---|---|---|---|---|---|---|---|---|---|
| TS/TL | 0.20 | 0.45 | 0.25 | 0.30 | 0.80 | 1.0 | 0.45 | 0.45 | 0.45 |
| Rob/Rib | 1.6 | 1.6 | 1.6 | 1.6 | 1.6 | 1.6 | 1.0 | 1.1 | 2.0 |
| Wso-Wsh (mm) | 0.5 | 0.5 | 0.5 | 0.5 | 0.5 | 0.5 | 0.5 | 0.5 | 0.5 |
| Roa/Rob | 18.75 | 18.75 | 18.75 | 18.75 | 18.75 | 18.75 | 18.75 | 18.75 | 18.75 |
| Ria/Rib | 40 | 40 | 40 | 40 | 40 | 40 | 40 | 40 | 40 |
| Roa (mm) | 15 | 15 | 15 | 15 | 15 | 15 | 15 | 15 | 15 |
| demolding (%) | 15 | 0 | 6 | 4 | 0 | 0 | 0 | 0 | 4 |

TABLE 1-continued

| crack resistance (%) | 0 | 0 | 0 | 0 | 8 | 20 | 15 | 6 | 0 |
|---|---|---|---|---|---|---|---|---|---|
| Tire | Ex. 7 | Ex. 8 | Ex. 9 | Ex. 10 | Ex. 11 | Ex. 12 | Ex. 13 | Ex. 14 | Ex. 15 |
| TS/TL | 0.45 | 0.45 | 0.45 | 0.45 | 0.45 | 0.45 | 0.45 | 0.45 | 0.45 |
| Rob/Rib | 2.2 | 1.6 | 1.6 | 1.6 | 1.6 | 1.6 | 1.6 | 1.6 | 1.6 |
| Wso-Wsh (mm) | 0.5 | 0.3 | 0.4 | 0.6 | 0.7 | 0.5 | 0.5 | 0.5 | 0.5 |
| Roa/Rob | 18.75 | 18.75 | 18.75 | 18.75 | 18.75 | 8 | 10 | 40 | 42 |
| Ria/Rib | 40 | 40 | 40 | 40 | 40 | 40 | 40 | 40 | 40 |
| Roa (mm) | 15 | 15 | 15 | 15 | 15 | 15 | 15 | 15 | 15 |
| demolding (%) | 6 | 0 | 0 | 2 | 6 | 4 | 2 | 0 | 0 |
| crack resistance (%) | 2 | 6 | 2 | 0 | 0 | 2 | 0 | 2 | 4 |
| Tire | Ex. 16 | Ex. 17 | Ex. 18 | Ex. 19 | Ex. 20 | Ex. 21 | Ex. 22 | Ex. 23 | Ex. 24 |
| TS/TL | 0.45 | 0.45 | 0.45 | 0.45 | 0.45 | 0.45 | 0.45 | 0.45 | 0.45 |
| Rob/Rib | 1.6 | 1.6 | 1.6 | 1.6 | 1.6 | 1.6 | 1.6 | 1.6 | 1.6 |
| Wso-Wsh (mm) | 0.5 | 0.5 | 0.5 | 0.5 | 0.5 | 0.5 | 0.5 | 0.5 | 0.5 |
| Roa/Rob | 18.75 | 18.75 | 18.75 | 18.75 | 18.75 | 18.75 | 18.75 | 18.75 | 18.75 |
| Ria/Rib | 22 | 25 | 60 | 63 | 40 | 40 | 40 | 40 | 40 |
| Roa (mm) | 15 | 15 | 15 | 15 | 4 | 5 | 10 | 20 | 22 |
| demolding (%) | 4 | 2 | 0 | 0 | 2 | 0 | 0 | 0 | 0 |
| crack resistance (%) | 2 | 0 | 4 | 6 | 4 | 2 | 0 | 0 | 2 |

REFERENCE SIGNS LIST 2 tread portion
5 ground contacting tread element (block)
6 sipe
6n center line of sipe
11s outside sidewall surface of sipe
11u inside sidewall surface of sipe
13 constant width part of sipe
14 widening part of sipe
15 outside most protruding point
16 inside most protruding point
17 outside curved bottom surface
18 inside curved bottom surface

The invention claimed is:

1. A pneumatic tire comprising
a tread portion having a tread surface and provided with a plurality of ground contacting tread elements made of rubber,
each of the ground contacting tread elements provided with at least one pair of sipes extending substantially parallel with each other,
each of the sipes comprising
a constant width part having a constant width and extending radially inwardly from the tread surface and
a widening part extending radially inwardly from the constant width part while gradually increasing the width of the sipe and then extending to the radially inner end of the sipe while gradually decreasing the width of the sipe,
each of the paired sipes having
an inside sidewall surface (11u) positioned toward the other of the paired sipes and
an outside sidewall surface (11s) positioned away from the other of the paired sipes,
in the cross section of the sipe perpendicular to the longitudinal direction of the sipe, the outside sidewall surface in the widening part having an outside most protruding point (15) protruding toward the outside of the sipe and including an outside curved bottom surface (17) extending radially inwardly from the outside most protruding point toward the center line (6n) of the sipe while describing an arc, and
the inside sidewall surface in the widening part having an inside most protruding point (16) protruding toward the outside of the sipe and including an inside curved bottom surface (18) extending radially inwardly from the inside most protruding point (16) toward the center line (6n) of the sipe while describing an arc, wherein
the inside curved bottom surface has a radius of curvature Rib and the outside curved bottom surface has a radius of curvature Rob more than the radius of curvature Rib.

2. The pneumatic tire according to claim 1, wherein
the outside most protruding point is shifted from the inside most protruding point in the tire radial direction.

3. The pneumatic tire according to claim 2, wherein
the outside most protruding point is positioned radially outside the inside most protruding point.

4. The pneumatic tire according to any one of claims 1-3, wherein
the shortest distance Wso from the outside most protruding point (15) to a center line (6n) of the sipe, the shortest distance Wsi from the inside most protruding point (16) to the center line (6n) of the sipe, and the shortest distance Wsh from the sidewall surface (11) of the constant width part (13) to the center line (6n) of the sipe satisfy the following relationship:

$Wso-Wsh = <0.6$ mm, and $Wsi-Wsh = <0.6$ mm.

5. The pneumatic tire according to claim 1, wherein
the outside sidewall surface (11s) of the widening part (14) includes an outside concave surface (19) extending radially inwardly toward the outside most protruding point (15) while gradually increasing the distance from the center line (6n) of the sipe.

6. The pneumatic tire according to claim 5, wherein
the inside sidewall surface (11u) of the widening part (14) includes an inside concave surface (20) extending radially inwardly toward the inside most protruding point (16) while gradually increasing the distance from the center line (6n) of the sipe.

7. The pneumatic tire according to claim 6, wherein
the outside concave surface has a radius of curvature Roa more than said radius of curvature Rob of the outside curved bottom surface, and
the inside concave surface has a radius of curvature Ria more than said radius of curvature Rib of the inside curved bottom surface.

8. The pneumatic tire according to claim 1, wherein
said plurality of ground contacting tread elements are at least one row of circumferentially arranged blocks, each block provided with one pair of said sipes each extending at an angle of not more than 20 degrees with respect to the tire axial direction, and
a minim circumferential distance (TS) between the sipes is more than 0.2 times and less than 1.0 times a minimum circumferential distance from each of the sipes to a circumferential end of the block on the same side as the sipe concerned.

* * * * *